United States Patent [19]
Takagi et al.

[11] Patent Number: 5,878,313
[45] Date of Patent: Mar. 2, 1999

[54] DEVELOPING ROLLER AND APPARATUS

[75] Inventors: Koji Takagi, Kawasaki; Yoshio Takizawa, Fussa; Eiji Sawa, Fujisawa, all of Japan

[73] Assignee: Bridgestone Corporation, Tokyo, Japan

[21] Appl. No.: 883,601

[22] Filed: Jun. 26, 1997

[30] Foreign Application Priority Data

Sep. 2, 1996 [JP] Japan ..................................... 8-250952

[51] Int. Cl.$^6$ .................................................... G03G 15/08
[52] U.S. Cl. ........................................... 399/279; 430/120
[58] Field of Search ..................................... 399/279, 265, 399/252, 222, 285, 286, 280, 281, 282, 283, 284; 430/120

[56] References Cited

U.S. PATENT DOCUMENTS 5,488,341  1/1996  Yamamoto et al. ..................... 335/302

FOREIGN PATENT DOCUMENTS 0 548 952 A2  6/1993  European Pat. Off. .

OTHER PUBLICATIONS

Patent Abstracts of Japan for JP 05–303283.

Patent Abstracts of Japan for JP 60–115421.

Patent Abstracts of Japan for JP 60–115422.

*Primary Examiner*—Arthur T. Grimley
*Assistant Examiner*—Hoan Tran
*Attorney, Agent, or Firm*—Sughrue, Mion, Zinn, Macpeak & Seas, PLLC

[57] ABSTRACT

A developing roller (1) includes a highly conductive shaft (2) and a conductive elastic layer (3). When the developing roller carring a one-component developer thereon comes in contact with or in proximity to an image forming body, the developer is supplied from the roller to a surface of the image forming body, thereby forming a visible image on the image forming body surface. The elastic layer (3) has applied to its surface a resin component having an elongation at rupture of less than 10% as measured according to JIS K7113. The developing roller ensures that images of high quality are reproduced without a drop of image density over a long period of time.

15 Claims, 3 Drawing Sheets

TYPE 1 TEST PIECE

UNIT : mm

| | | |
|---|---|---|
| A | OVERALL LENGTH | 175 |
| B | WIDTH AT ENDS | 20 ± 0.5 |
| C | LENGTH OF NARROW PARALLEL PORTION | 60 ± 0.5 |
| D | WIDTH OF NARROW PARALLEL PORTION | 10 ± 0.5 |
| E | RADIUS OF FILLETS (min) | 60 |
| F | THICKNESS | 1 TO 10 |
| G | GAUGE LENGTH | 50 ± 0.5 |
| H | DISTANCE BETWEEN GRIPS | 115 ± 5 |

FIG.4

L : REFERENCE LENGTH

R1, R3, R5, R7, R9 : ALTITUDES OF PEAKS FROM THE HIGHEST TO THE 5TH FOR THE SAMPLED PORTION CORRESPONDING TO THE REFERENCE LENGTH L.

R2, R4, R6, R8, R10 : ALTITUDES OF VALLEYS FROM THE DEEPEST TO THE 5TH FOR THE SAMPLED PORTION CORRESPONDING TO THE REFERENCE LENGTH L.

$$Rz = \frac{(R_1, R_3, R_5, R_7, R_9) - (R_2, R_4, R_6, R_8, R_{10})}{5}$$

DEVELOPING ROLLER AND APPARATUS

BACKGROUND OF THE INVENTION

1. Field of the Invention

This invention relates to a developing roller for use in electrophotographic and electrostatic recording machines such as copiers and printers for supplying a one-component developer to an image forming body for forming a visible image on the surface of the image forming body. More particularly, it relates to a developing roller which is durable so that acceptable images can be reproduced without a drop of image density over a long period of time. It also relates to a developing apparatus using the same developing roller.

2. Prior Art

In conjunction with prior art electrophotographic and electrostatic recording machines such as copiers and printers, one typical developing method is an impression developing method as disclosed in U.S. Pat. Nos. 3,152,012 and 3,731,146. This developing method visualizes electrostatic latent images by supplying a one-component developer to a photoconductor drum bearing a latent image, thereby adhering the developer to the latent image. Since the impression developing method eliminates a need for magnetic material, the apparatus can be simple and compact and color toner can be used.

More particularly, the impression developing method is printed by bringing a developing roller carrying a toner, typically non-magnetic one-component developer in contact with a latent image holder or photoconductor drum bearing an electrostatic latent image, thereby adhering the toner to the latent image. The developing roller must be formed of an elastic material having electrical conductivity.

Figure 2:
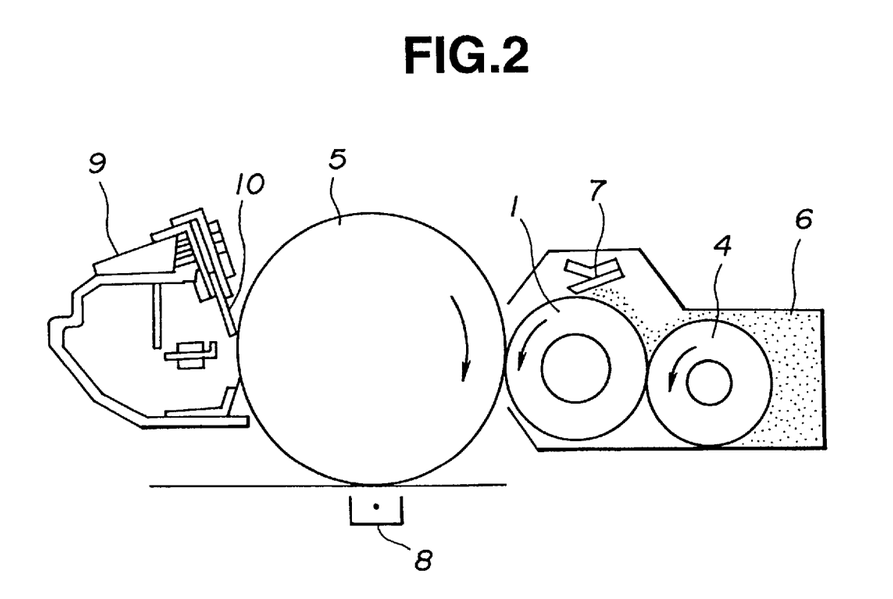
FIG. 2 schematically illustrates a developing apparatus according to the invention.

Referring to FIG. 2, the impression developing method is briefly described. A developing roller 1 is placed between a toner feed roller 4 for feeding a toner 6 and a photoconductor drum 5 having an electrostatic latent image borne thereon. Upon rotation of the developing roller 1, photoconductor drum 5, and toner feed roller 4 in the directions shown by arrows, the toner 6 is fed from the feed roller 5 onto the surface of the developing roller 1 and regulated into a uniform thin layer by a doctor blade 7. The thin layer of toner is then delivered from the developing roller 1 to the photoconductor drum 5 to adhere to the latent image whereby the latent image is developed into a visible toner image. The toner image is finally transferred from the photoconductor drum 5 to a recording medium, typically paper in a transfer section 8. Also included in the device is a cleaning section 9 having a cleaning blade 10 for scraping off the toner left on the photoconductor drum 5 after the transfer step.

Figure 1:
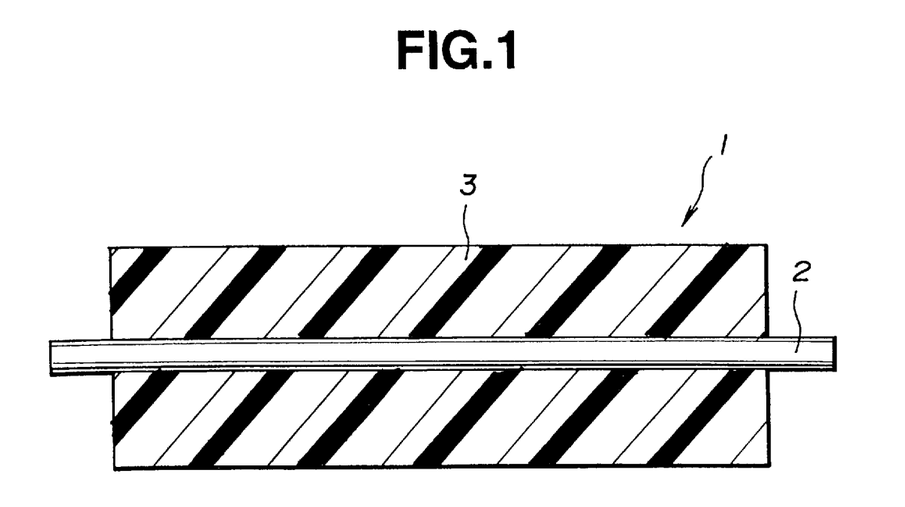
FIG. 1 is a schematic cross-sectional view of a developing roller according to the invention.

During rotation, the developing roller 1 must maintain close contact with the photoconductor drum 5. The conventional developing roller 1 is of a structure having a conductive elastic layer 3 around a shaft 2 as shown in FIG. 1. The shaft 2 is of a highly conductive material, typically metal. The conductive elastic layer 3 is formed of a conductive elastomer in the form of an elastic rubber such as silicone rubber, acrylonitrile-butadiene rubber (NBR), and ethylene-propylene-diene terpolymer (EPDM) or a sponge such as urethane foam, with a suitable conductive agent being blended therein.

However, prior art developing rollers had the following problems resulting from the properties of elastic layers used therein. (1) Where the elastic layer of the developing roller is formed of an elastic rubber such as silicone rubber, NBR and EPDM having a low hardness enough to achieve tight contact, oil components contained in the rubber bleed out to the roller surface, which becomes sticky to the toner. This can cause a drop of image density after a long period of operation. (2) Where a spongy body such as urethane foam is used to form the elastic layer, toner can penetrate into pores in the elastic layer. As the penetrating toner accumulates from long-term use, the roller becomes harder and electrical charging of toner becomes inefficient, resulting in a drop of image density.

The latent image holder can be a belt instead of the drum. Another image forming system is known wherein toner is directly delivered from a developing roller to a recording medium in the form of a sheet of plain paper, OHP film and photographic paper. In these systems, the same developing roller can be used and the same problems will occur as in the aforementioned system.

Therefore, an object of the present invention is to provide a developing roller which ensures that images of quality are reproduced without a drop of image density over a long period of time. Another object of the present invention is to provide a developing apparatus using such a developing roller.

SUMMARY OF THE INVENTION

This invention is directed to a developing roller comprising a highly conductive shaft and an elastic layer with conductivity formed around the shaft. The developing roller is adapted to carry a one-component developer on its surface to form a thin layer of the developer. When the developing roller comes in contact with or in proximity to an image forming body, the developer is supplied from the developing roller to a surface of the image forming body, thereby forming a visible image on the surface of the image forming body. The image density gradually drops as the process continues. The inventors have found that the drop of image density over a long period of use is closely related to the surface state of the roller. Focusing at the surface state of the developing roller, the inventors have found that a drop of image density can be restrained over a long term of use by imparting to the surface of the elastic layer a resin component capable of improving the surface state, specifically a resin component having an elongation at rupture of less than 10% as measured according to JIS K7113.

Then, images of quality can be reproduced without a drop of image density over a long period of time. Additionally, the quality of initial image is improved.

According to a first aspect of the invention, there is provided a developing roller comprising a highly conductive shaft and a conductive elastic layer formed around the shaft, which is adapted to carry a one-component developer on its surface to form a thin layer of the developer and come in contact with or in proximity to an image forming body for supplying the developer from the developing roller to a surface of the image forming body, thereby forming a visible image on the surface of the image forming body, wherein the elastic layer has applied to its surface a resin component having an elongation at rupture of less than 10% as measured according to JIS K7113.

According to a second aspect of the invention, there is provided a developing apparatus comprising an image forming body and a rotatable developing roller for carrying a one-component developer on its outer surface wherein the developing roller is brought in contact with or in proximity to the surface of the image forming body while rotating whereby the developer is adhered to the surface of the image forming body to form a visible image on the surface of the image forming body, wherein the developing roller defined in the first aspect is used.

Although it is not well understood why imparting the specific resin component to the surface of the elastic layer is effective for preventing the developing roller from lowering the image density over a long term of operation, the inventors presume as follows. The presence of a resin component with a very low elongation (specifically, an elongation at rupture of less than 10%) on the surface of the developing roller is effective for preventing the roller surface from deformation in the developing step. Such a low elongation resin component experiences little change of its properties over a long term of use and thus maintains the surface state. This contributes to the advantage of preventing a drop of image density. The electric charging of the developing developer can be controlled by properly selecting the resin component in accordance with a particular application of the developing roller and a particular developer to be combined. Then images of better quality are reproducible.

In the developing roller of the invention, the roughness of the elastic layer surface is changed by imparting the specific resin component thereto. It would be desirable if an appropriate surface roughness is obtained after the application of the resin component and without detracting from the effect of the resin component imparted. The inventors have found that this can be accomplished by optimizing the relationship of the surface roughness of the original elastic layer to the thickness of the resin component applied to the elastic layer surface so that the low elongation resin component is thinner than the surface roughness of the elastic layer. Then the developing roller maintains an appropriate surface roughness even after the application of the resin component. More particularly, provided that the elastic layer surface has a ten point mean roughness Rz as defined in JIS B0601 and the resin component applied to the elastic layer surface has a thickness t, the relationship: $0.01 < t/Rz < 2$ is satisfied. Then the developing roller maintains an appropriate surface roughness and hence, an appropriate capability to carry the developer and improves electric charging property and durability.

BRIEF DESCRIPTION OF THE DRAWINGS

These and further features of the present invention will be apparent with reference to the following description and drawings, wherein.

DESCRIPTION OF THE PREFERRED EMBODIMENTS

Referring to FIG. 1, there is illustrated a developing roller according to the invention. The developing roller 1 includes a highly conductive shaft 2 and a cylindrical elastic layer 3 formed around the shaft 2 and having conductivity. According to the invention, a resin component having an elongation at rupture of less than 10% (inclusive) as measured according to JIS K7113 is applied to the surface of the elastic layer 3.

Any desired shaft material may be used insofar as it is a good conductor. The shaft is typically selected from metallic shafts, for example, solid metal cores and hollow metal cylinders.

The elastic layer 3 around the shaft 2 is generally formed of a composition comprising a base resin such as elastomers (typically polyurethane and EPDM), foams and other resins and a conductive agent. Examples of the conductive agent include conductive powders such as carbon black, metals and metal oxides and ionic conductive substances such as sodium perchlorate although the conductive agent will be described later in more detail. The conductive agent is blended such that the composition (elastic layer) may have a resistivity in the medium range of $10^3$ to $10^{10} \Omega$ cm, especially $10^4$ to $10^8 \Omega$ cm.

The base of the elastic layer composition is generally selected from polyurethane, natural rubber, butyl rubber, nitrile rubber, polyisoprene rubber, polybutadiene rubber, silicone rubber, styrene-butadiene rubber (SBR), ethylene-propylene rubber, ethylene-propylene-diene terpolymer (EPDM), chloroprene rubber, acryl rubber, and mixtures thereof. Polyurethane and EPDM are preferred. The other resins which can be used as the base include phenolic resins, polyesters, and polycarbonates.

The polyurethane which can be used as the base of the elastic layer 3 is first described. There may be used any of polyurethane elastomers and foams which are conventionally prepared. For example, they may be prepared by blending carbon black in polyurethane prepolymer and subjecting the prepolymer to crosslinking reaction. Another known method is by blending a conductive material in a polyol and reacting it with a polyisocyanate by a one-shot technique. The polyurethane is generally prepared from a polyhydroxyl compound and a polyisocyanate compound. As the polyhydroxyl compound, use may be made of polyols commonly used in the preparation of flexible polyurethane foams and urethane elastomers, such as polyether polyols and polyester polyols terminated with a polyhydroxyl group, and polyester polyether polyols obtained by copolymerizing the former two; and other conventional polyols, for example, polyolefin polyols such as polybutadiene polyols and polyisoprene polyols, and polymer polyols obtained by polymerizing ethylenically unsaturated monomers in polyols. Examples of the polyisocyanate compound include polyisocyanates commonly used in the preparation of flexible polyurethane foams and urethane elastomers, such as tolylene diisocyanate (TDI), crude TDI, diphenylmethane-4,4'-diisocyanate (MDI), crude MDI, aliphatic polyisocyanates having 2 to 18 carbon atoms, alicyclic polyisocyanates having 4 to 15 carbon atoms, and mixtures and modified products of these polyisocyanates, e.g., prepolymers partially reacted with polyols.

EPDM is a terpolymer of ethylene, propylene, and a third component. The third component is not critical although it is preferably selected from dicyclopentadiene, ethylidene norbornene, and 1,4-hexadiene. The proportion of ethylene, propylene, and the third component is not critical although it is preferred that the content of ethylene is 5 to 95% by weight, the content of propylene is 5 to 95% by weight, and the content of third component corresponds to an iodine value of 0 to 50. A mixture of two or more EPDM having different iodine values is also acceptable. Also EPDM may be blended with silicone rubber and/or silicone-modified EPDM. Better results are obtained when 100 parts by weight of EPDM is blended with 5 to 80 parts by weight of silicone rubber and/or silicone-modified EPDM. It is noted that the silicone-modified EPDM is a hybrid rubber wherein the bonding force between EPDM and silicone polymers is enhanced by a silanol compound or siloxane.

Crosslinking agents and vulcanizing agents may be added to the elastic layer composition in order to crosslink the base resin into a rubbery material of which the elastic layer is made. In either of organic peroxide and sulfur crosslinking systems, crosslinking aids, vulcanization accelerators, vulcanization co-accelerators, and vulcanization retarders may be used. Additionally, there may be blended other additives commonly used in rubber, for example, peptizers, blowing agents, plasticizers, softeners, tackifiers, anti-tack agents, separating agents, mold release agents, extenders, and coloring agents.

To the elastic layer composition based on polyurethane or EPDM, there may be added various charge control agents such as Nigrosine, triaminophenylmethane, and cationic dyes for the purpose of controlling the charge quantity of toner on the surface of the developing roller as well as microparticulate fillers such as silicone resin, silicone rubber, and nylon. Better results are obtained when 100 parts by weight of polyurethane or EPDM is blended with about 1 to 5 parts by weight of the charge control agent and about 1 to 10 parts by weight of the microparticulate filler.

As previously mentioned, conductive agents including conductive powders and ionic conductive substances are blended in the elastic layer composition for imparting appropriate conductivity thereto. Examples of the conductive powder include conductive carbon such as Ketjen Black EC and acetylene black; carbon for rubber such as SAF, ISAF, HAF, FEF, GPF, SRF, FT, and MT; oxidized carbon for color ink; pyrolytic carbon; natural graphite, synthetic graphite; metals and metal oxides such as antimony-doped tin oxide, titanium oxide, zinc oxide, nickel, copper, silver and germanium; and conductive polymers such as polyaniline, polypyrrole, and polyacetylene. Among others, carbon black is preferred since it is inexpensive and easy to control conductivity with small amounts. Preferably about 0.5 to 50 parts, more preferably about 1 to 30 parts by weight of the conductive powder is blended with 100 parts by weight of the base (e.g., polyurethane and EPDM).

Examples of the ionic conductive substance include inorganic ionic conductive substances such as sodium perchlorate, lithium perchlorate, calcium perchlorate, and lithium chloride and organic ionic conductive substances such as modified aliphatic dimethylammonium ethosulfates, stearylammonium acetate, laurylammonium acetate, octadecyl-trimethylammonium perchlorate, and tetrabutylammonium borofluorate.

The conductive agent is preferably blended such that the composition (elastic layer) may have a resistance in the medium range of $10^3$ to $10^{10}\Omega$ cm, especially $10^4$ to $10^8\Omega$ cm. With a resistance of less than $10^3\Omega$ cm, electric charges can leak to the image forming body, typically to the photoconductor drum, and the developing roller itself can be broken by the applied voltage. With a resistance of more than $10^{10}\Omega$ cm, background fogging would often occur in the developed image.

The hardness of the elastic layer 3 is not critical. When development is carried out by bringing the developing roller in contact with image forming bodies such as latent image holders (typically photoconductor drums) and sheets of paper, the elastic layer 3 should preferably have a hardness of less than about 60°, especially 25° to 55° on JIS A scale. With a hardness of more than 60°, the contact area with the image forming body would be reduced, failing to carry out satisfactory development. Too low hardness would invite an excessive compression set, which would cause a density variation in the toner image when the developing roller is deformed or radially misaligned for some reason or other. Then when the elastic layer is to be adjusted to a low hardness, it is preferred to minimize the compression set, typically to 20% or less.

In the developing roller according to the invention, the elastic layer at its surface bears a resin component having an elongation at rupture of less than 10% as measured according to JIS K7113.

The resin component used herein is not critical insofar as it has the specific elongation and is not contaminative to image forming bodies such as latent image holders (typically photoconductor drums) and sheets of paper. Examples include urea resins, melamine resins, alkyd resins, modified alkyd resins (e.g., phenol and silicone-modified alkyd resins), oil-free alkyd resins, acryl resins, silicone resins, fluoro-resins, phenol resins, polyamide resins, epoxy resins, polyester resins, maleic resins, and urethane resins. Among these, urea resins, melamine resins, silicone resins, phenolic resins, alkyd resins, modified alkyd resins, oil-free alkyd resins, acryl resins, and moisture-curable urethane resins are preferred from the standpoints of film formation and adhesion. Especially mixtures of a modified alkyd resin or oil-free alkyd resin and a melamine resin and phenolic resins are preferred since they have a low elongation and high mechanical strength. The melamine resins are advantageous in that they are able to supply electrons due to the presence of unpaired electrons in a nitrogen group moiety of the resin. The phenolic resins are advantageous in that they have a high dielectric constant and are dielectric.

The resin component should have an elongation at rupture of less than 10%, preferably less than 5% as measured according to JIS K7113. With an elongation at rupture of more than 10%, the roller would be deformed on its surface during a long term of use so that the roller might carry more or less amounts of the developer to cause a drop of image density. The lower limit of the elongation at rupture is not critical although it is usually about 0.1%.

Figure 3:
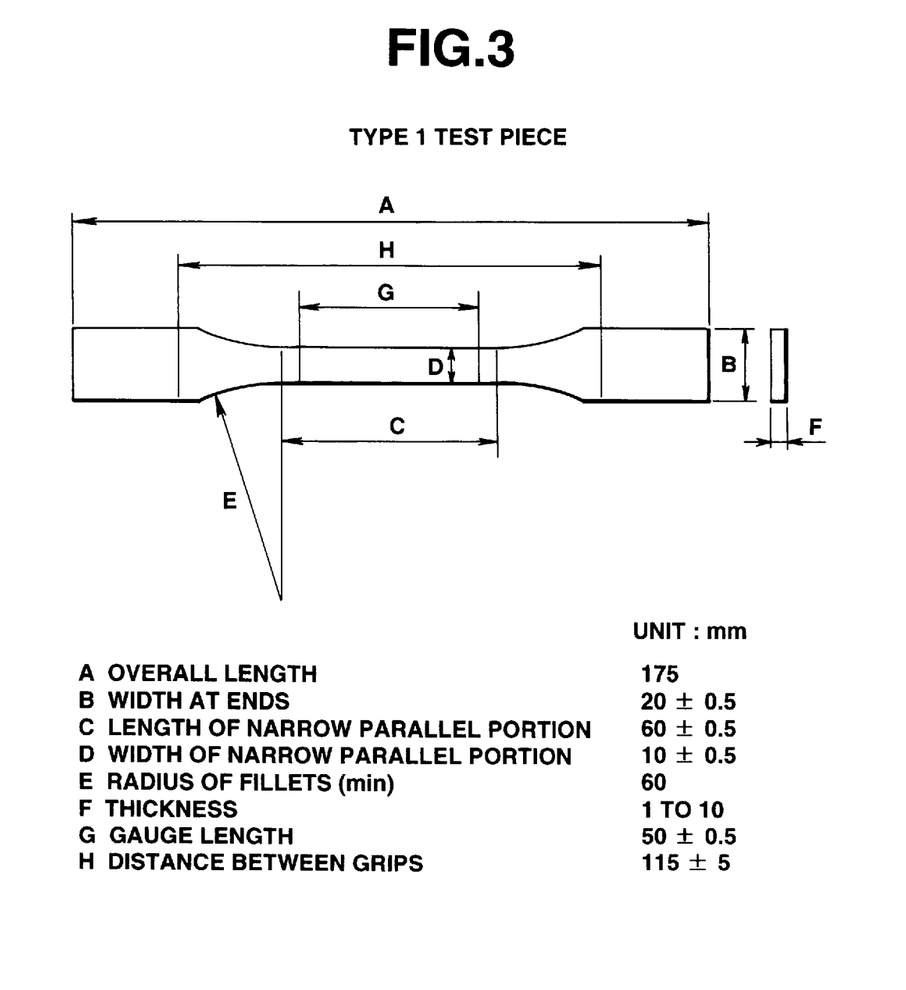
FIG. 3 illustrates a type 1 test piece used in the tensile test of JIS K7113.

The measurment of elongation at rupture according to JIS K7113 is briefly described. FIG. 3 shows a type 1 test piece prescribed in the standard. The test piece is mounted in a prescribed testing machine and elongated until it ruptures. The percentage elongation at rupture (E) is calculated by the equation:

$$E=(L-L_0)/L_0\times 100$$

wherein L is a distance (mm) between reference lines at rupture and $L_0$ is an initial gauge length (mm).

The resin component may or may not contain a conductive substance. That is, the resin component may contain a conductive substance if necessary for adjusting the electric resistance of the roller. When added, the conductive substance is preferably selected from the aforementioned conductive powders, with carbon black being especially preferred.

Means for applying the resin component to the surface of the elastic layer is not critical although it is preferred to treat the elastic layer on its surface with a solution containing the resin component in a solvent. After preparation of the treating solution, surface treatment may be done by spraying, roll coating and dipping methods. In the case of surface treatment by dipping, for example, a roller having an elastic layer formed thereon is dipped in the resin solution having a desirable resin concentration (for example, less than 15% by weight), typically at room temperature for 5 seconds to 5 minutes, preferably 10 seconds to 1 minute, pulling up the roller, and drying. Where spraying is employed, the resin solution may have a higher resin concentration than used in dipping, for example, 5 to 30% by weight. The solvent used herein is not critical insofar as the resin component is soluble therein. Preferred solvents are lower alcohols such as methanol, ethanol, and isopropanol, ketones such as acetone, methyl ethyl ketone (MEK), and cyclohexanone, and aromatic solvents such as toluene and xylene.

The above-described surface treatment with the resin component is effective for reducing the friction of the roller surface to a certain extent although various additives may be added to the resin component for the purpose of further reduction of friction. Examples of the additive which do not contaminate the photoconductor or deteriorate the uniformity of surface treatment with the resin component and which can reduce friction include silicone resins, silicone resin powder, fluorinated and silicone surfactants, silicon coupling agents, and silica powder. The silicone resins used herein are those soluble in solvents, for example, methyl silicone, methylphenyl silicone, modified products thereof, and silicone-epoxy block copolymers. The silicone resin powder used herein may be microparticulate powders of methyl silicone polymers, methylphenyl silicone polymers, and amino-modified silicone polymers, of spherical or irregular shape having a mean particle size of 0.1 to 100 μm. The fluorinated surfactants include ionic surfactants in the form of alkyl fluorides bonded with carboxylic acids, carboxylates or sulfonates, non-ionic surfactants in the form of alkyl fluorides bonded with alcohols or ethers, and polymeric surfactants in the form of polymers and copolymers containing alkyl fluoride in their backbone. The silicone surfactants include polymers of methyl silicone such as siloxaneoxyethylene bonded with hydrophilic or lipophilic segments and copolymers of methylsilicone with acrylic segments. The silicon coupling agents include conventional silane coupling agents and silanes having an amino, isocyanate or vinyl group introduced at a terminal. These additives may be used alone or in admixture of two or more. It is noted that fluorocarbon resins are also effective friction reducing agents. The friction reducing agent is preferably used in an amount of about 1 to 100 parts, especially about 10 to 75 parts by weight per 100 parts by weight of the resin component. When the ionic conductive substance is used as the conductive agent, it is used in an amount of 0.001 to 1 part by weight per 100 parts by weight of the resin component.

In one preferred embodiment of the invention, the surface roughness of the elastic layer and the thickness of the resin component are adjusted to satisfy the relationship: 0.01<t/Rz<2, preferably 0.01<t/Rz<1 provided that the elastic layer surface has a ten point mean roughness Rz as defined in JIS B0601 and the resin component applied to the elastic layer surface has a thickness t, both expressed in microns. This adjustment allows the developing roller to maintain an appropriate surface roughness and hence, an appropriate capability to carry the developer. Additionally, the roller is improved in electric charging property and durability. If t/Rz≧2, then the overall roller is reduced in surface roughness and would carry a shorter amount of toner. If t/Rz≦0.01, then the overall roller would be less durable and fail to achieve the advantages of the invention.

Insofar as the above-defined relationship is satisfied, the surface roughness Rz of the elastic layer and the thickness t of the resin component are not particularly limited. Preferably the elastic layer has a JIS ten point mean roughness Rz of less than about 30 μm, more preferably about 0.1 to 30 μm, most preferably about 1 to 15 μm. Also preferably the resin component has a thickness t of about 0.1 to 20 μm, more preferably about 1 to 10 μm. The surface roughness of the elastic layer 3 having the resin component applied thereto, that is, the surface roughness of the overall developing roller is preferably less than about 15 μm, more preferably about 1 to 10 μm in JIS ten point mean roughness though not limited thereto.

It is understood that by the above-mentioned surface treatment, the resin component is applied to the surface of the elastic layer 3 in various ways. More particularly, after the developing roller is surface treated with the resin component, the resin component may form a coating which covers the entire surface of the elastic layer, be discretely distributed in recesses of the minute irregular surface of the elastic layer, or cover the majority of the surface of the elastic layer in such a manner that protrusions on the minute irregular surface of the elastic layer are exposed beyond the resin component coating. Therefore, the thickness t of the resin component is an average thickness of the resin component distributed on the elastic layer surface in such different ways and is determined by the following procedure, for example. Several pieces (1 cm×1 cm) of the elastic layer having the resin component applied thereto are cut from the roller at different positions. The cross section of the pieces was observed under an electron or optical microscope to measure the thickness of the resin component. The sum of the thickness measurements is divided by the number of the elastic layer pieces to give the (average) thickness t. The means for observing the thickness of the resin component is not limited to the microscopes and any of other well-known means may be used.

Figure 4:
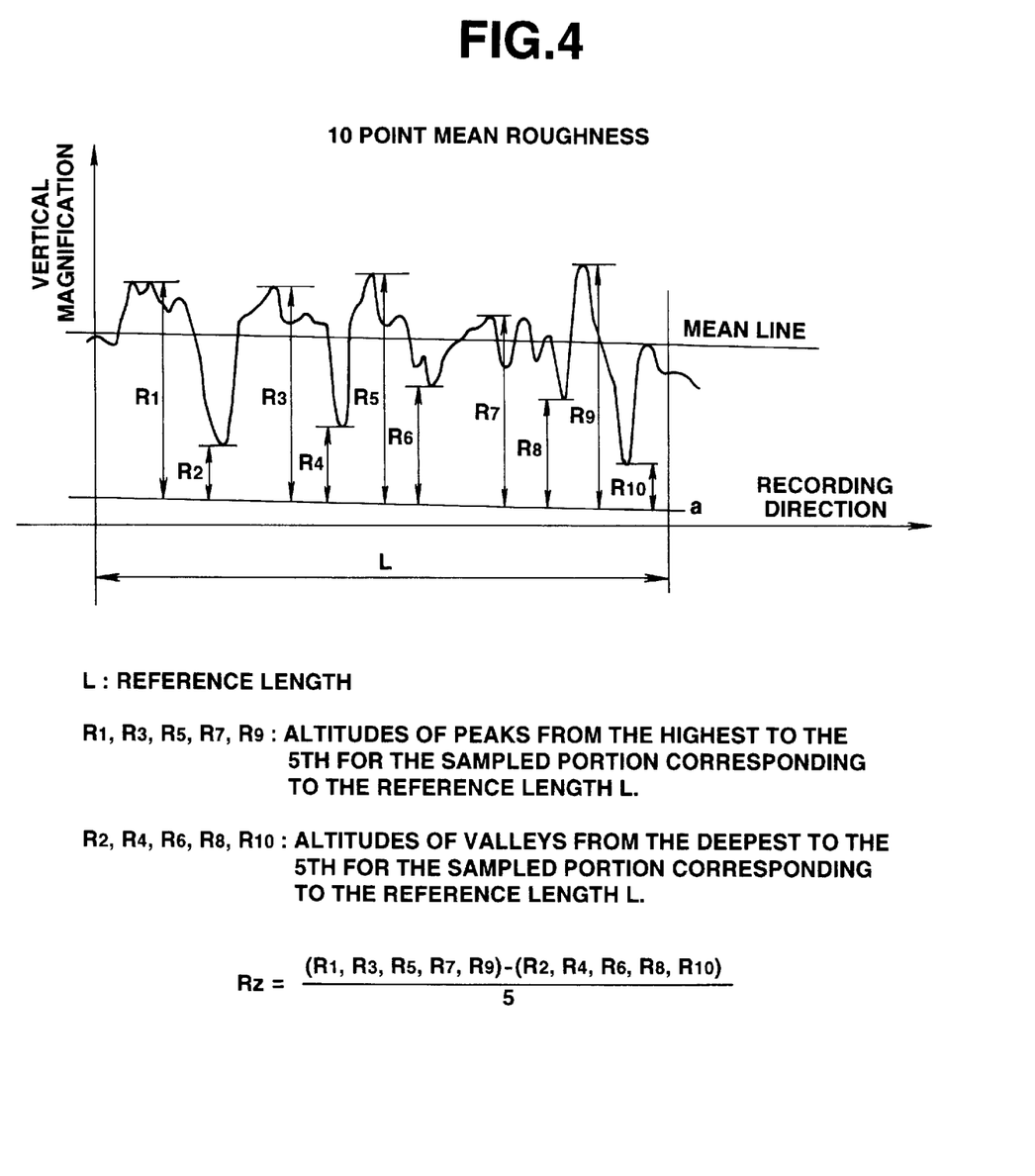
FIG. 4 illustrates how to determine a ten point mean roughness Rz according to JIS B0601.

The ten point mean roughness Rz is defined in JIS B0601-1982. The terms, surface roughness, profile, reference length of profile, roughness curve, cut-off value, mean line of profile, and profile peak and valley are as defined in the standard. In FIG. 4, the ten-point mean roughness shall be the difference of values, being expressed in micrometer (μm), between the mean value of altitudes of peaks from the highest to the 5th, measured in the direction of vertical magnification from a straight line a that is parallel to the mean line and that does not intersect the profile, and the mean value of altitudes of valleys from the deepest to the 5th, within a sampled portion, of which length corresponds to the reference length, from the profile. The profile may be depicted by means of a probe meter, for example. The ten-point mean roughness Rz is given by the following equation:

$$Rz=[(R_1+R_3+R_5+R_7+R_9)-(R_2+R_4+R_6+R_8+R_{10})]/5$$

wherein $R_1$, $R_3$, $R_5$, $R_7$ and $R_9$ are altitudes of peaks from the highest to the 5th for the sampled portion corresponding to the reference length L, and $R_2$, $R_4$, $R_6$, $R_8$, and $R_{10}$ are altitudes of valleys from the deepest to the 5th for the samples portion corresponding to the reference length L.

The developing roller of the invention can be mounted in conventional developing apparatus adapted to use a one-component developer. For example, as shown in FIG. 2, the developing roller 1 is disposed between the toner applicator roller 4 for feeding toner and the photoconductor drum 5 bearing an electrostatic latent image thereon, with the developing roller 1 set in contact with the photoconductor drum 5. Toner 6 is supplied from the toner applicator roller 4 to the developing roller 1 and regulated into a uniform thin layer by the regulating blade 7. The toner is then supplied from its thin layer on the developing roller to the photoconductor drum 5, thereby adhering the toner to the electrostatic latent image on the drum 5 for visualization. Although the developing roller 1 is in contact with the photoconductor drum 5 in FIG. 2, the developing roller need not contact an image forming body, typically the photoconductor drum 5. The developing roller may be disposed out of contact with, but in close proximity to the photoconductor drum insofar as the toner can be transmitted from the roller to the drum. The detail of the arrangement shown in FIG. 2 is omitted since it has been described in the preamble.

The developing roller of the invention is advantageously used when an electrostatic latent image borne on the surface of the photoconductor drum 5 is visualized with a one-component developer as shown in FIG. 2. However, the image forming body which receives the developer from the developing roller of the invention to form a visible image is not limited to the photoconductor drum. The developing roller of the invention can be used in combination with other latent image holders such as belts. The developing roller of the invention can also be used when a developer is supplied to a recording medium in the form of a sheet, for example, sheets of plain paper, OHP film and photographic paper, to thereby form a visible image on the sheet. For example, JP-A 129293/1996 discloses a mechanism comprising a back side electrode roller disposed on the back surface side of a sheet (e.g., a sheet of plain paper or OHP film) and a developing roller carrying a developer disposed in proximity to the front surface of the sheet, wherein the developer on the developing roller is moved toward the electrode roller under the control of an aperture electrode, thereby supplying the developer to the sheet disposed between the electrode roller and the developing roller to form a visible image on the sheet. The developing roller of the invention is advantageously used in this mechanism in that images of quality can be reproduced over a long period of time without a substantial drop of image density.

When development is carried out with the developing roller of the invention, a non-magnetic one-component developer is preferably used although a magnetic one-component developer may be used. The developing roller and apparatus of the invention can be advantageously used when black-and-white images are for example printed using a magnetic one-component developer.

EXAMPLE

Examples of the present invention are given below by way of illustration and not by way of limitation. All parts are by weight.

Surface treatment was done by dipping a roller in a resin solution at room temperature for 30 seconds. The thickness of resin on the elastic layer is an average thickness as defined previously.

Example 1

A polyol composition was prepared by premixing 100 parts of a polyether polyol Excenol 828 obtained by adding propylene oxide and ethylene oxide to glycerin so as to give a molecular weight of 5,000 and an OH value of 33 (Asahi Glass K.K.) with 1.0 part of 1,4-butane diol, 1.5 parts of a silicone surfactant L-520 (Nihon Unicar K.K.), 0.5 part of nickel acetylacetonate, 0.01 part of dibutyltin dilaurate, and 2.0 parts of acetylene black (Denki Kagaku Kogyo K.K.) in a mixer, and milling the mixture in a paint roll mill for uniformly dispersing the acetylene black.

A developing roller of the structure shown in FIG. 1 was prepared by agitating the polyol composition in vacuum for deaeration, adding 17.5 parts of urethane-modified MDI Sumidur PF (Sumitomo-Bayer Urethane K.K.) thereto, agitating the mixture for 2 minutes, casting the mixture into a mold at 110° C. with a metallic shaft set therein, curing the mixture for 2 hours, thereby forming an elastic layer around the shaft. The developing roll on the surface was ground to a surface roughness Rz of 7.0 μm on JIS ten point mean roughness scale.

The developing roller was surface treated by dipping it in a methyl ethyl ketone solution containing 10% by weight of a resin mixture of an oil-free alkyd resin Beccolite M-6402 and a melamine resin Super Beccamine L110 (both available from Dai-Nihon Ink Chemical Industry K.K.) in a weight ratio of 4:1, pulling up the roller, and heat drying. A cross section of the roller was observed to find that the resin mixture had been applied to the roller surface by the surface treatment to a thickness of 5 μm.

Separately, a type 1 test piece prescribed in JIS K7113 and shown in FIG. 3 was prepared from the same resin mixture of the oil-free alkyd resin and melamine resin as used in the surface treatment. A tensile test was carried out according to JIS K7113. The test piece showed an elongation at rupture of less than 3%.

Example 2

A developing roller was prepared as in Example 1 except that surface treatment was carried out using a methyl ethyl ketone solution containing 10% by weight of a resol type phenolic resin PR50232 (by Sumitomo Durez K.K.). A cross section of the roller was observed to find that the phenolic resin had been applied to the roller surface by the surface treatment to a thickness of 2 μm.

Using a type 1 test piece prepared from the phenolic resin, a tensile test was carried out according to JIS K7113. The test piece showed an elongation at rupture of less than 3%.

Example 3

A developing roller was prepared as in Example 2 except that 20 parts of carbon black Printex 35 (by Degussa Inc.) as a conductive agent was added to 100 parts of the phenolic resin for the surface treatment. A cross section of the roller was observed to find that the carbon black-loaded phenolic resin had been applied to the roller surface by the surface treatment to a thickness of 3 μm.

Using a type 1 test piece prepared from the carbon black-loaded phenolic resin, a tensile test was carried out according to JIS K7113. The test piece showed an elongation at rupture of less than 3%. The carbon black-loaded phenolic resin had a resistivity of $10^4 \Omega$ cm, indicating that the resin was made conductive by the addition of carbon black.

Example 4

A developing roller was prepared as in Example 1 except that the surface treatment by dipping was repeated several times to increase the thickness of the resin applied to the roller surface. A cross section of the roller was observed to find that the resin mixture had been applied to the roller surface to a thickness of 20 μm. The roller was measured for resistance by the method described later. It had a resistance of $10^{11} \Omega$, indicating that substantially the entire roller surface was covered with the resin.

Comparative Example 1

A developing roller was prepared as in Example 1 except that surface treatment was carried out using a methanol solution containing 15% by weight of a soluble nylon copolymer CM8000 (by Toray K.K.). A cross section of the roller was observed to find that the nylon had been applied to the roller surface by the surface treatment to a thickness of 5 μm.

Using a type 1 test piece prepared from the nylon copolymer, a tensile test was carried out according to JIS K7113. The test piece showed an elongation at rupture of more than 100%.

Comparative Example 2

A developing roller was prepared as in Example 1 except that the surface treatment was omitted.

The developing rollers prepared in Examples and Comparative Examples were examined by the following tests.

Roller resistance

With a load of 500 grams attached to each end of a developing roller, the roller was placed under pressure contact with a copper plate. The roller was measured for resistance by means of a resistance meter R8340A (Advan Test K.K.) by applying a voltage of 100 volts.

Image reproduction

Images were reproduced through reversal development by mounting the developing roller in the developing unit of FIG. 2, rotating it at a circumferential speed of 60 mm/sec., and feeding a non-magnetic one-component toner having a mean particle size of 7 μm. The images at the initial and after 10,000 sheets of printing were examined for quality.

The results are shown in Table 1.

TABLE 1

|  | Surface resin | Elongation at rupture (%) | Elastic layer suface roughness Rz (μm) | Resin thickness t (μm) | t/Rz | Roller resistance (Ω) | Initial image | Durability to paper feed |
|---|---|---|---|---|---|---|---|---|
| E1 | alkyd/melamine | <3% | 7 | 5 | 0.7 | $3 \times 10^5$ | good | good after 10,000 sheets |
| E2 | phenol | <3% | 7 | 2 | 0.3 | $7 \times 10^4$ | good | good after 10,000 sheets |
| E3 | conductive phenol | <3% | 7 | 3 | 0.4 | $4 \times 10^4$ | good | good after 10,000 sheets |
| E4 | alkyd/melamine | <3% | 7 | 20 | 2.8 | $1 \times 10^{11}$ | slightly lower density than above, but fully acceptable | no change of image quality after 10,000 sheets |
| CE1 | nylon | >100% | 7 | 5 | 0.7 | $3 \times 10^5$ | good | density drop after 2,000 sheets |
| CE2 | none | — | 7 | — | — | $4 \times 10^4$ | slightly poor follow | Immediate density drop |

As is evident from Table 1, the developing rollers within the scope of the invention ensure to reproduce images of quality over a long period of operation while effectively restraining a drop of image density. The quality of initial images is satisfactory. The rollers of Examples 1 to 3 are effective in carrying the developer and ensure reproduction of images with an adequate density because the relationship of the surface roughness (Rz) of the elastic layer to the thickness (t) of the resin component applied thereto is optimized. After the image reproduction test, the developing roller of Comparative Example 1 was taken out and its surface was observed under a microscope to find that the surface state had been substantially changed, that is, the nylon at the surface had been elongated to flatten the surface. Probably because of this surface change, the developer was carried in short to cause a drop of image density.

There has been described a developing roller including an elastic layer having a low elongation resin component applied to its surface and a developing apparatus using the same. The developing roller and apparatus of the invention reproduce initial images of better quality and continue to reproduce images of quality over a long period of operation while effectively restraining a drop of image density.

Although some preferred embodiments have been described, many modifications and variations may be made thereto in the light of the above teachings. It is therefore to be understood that within the scope of the appended claims, the invention may be practiced otherwise than as specifically described.

We claim:

1. A developing roller comprising; a highly conductive shaft and a conductive elastic layer formed around the shaft, said developing roller being adapted to carry a one-component developer on it surface to form a thin layer of the developer and come in contact with or in proximity to an image forming body for supplying the developer from the developing roller to a surface of the image forming body, thereby forming a visible image on the surface of the image forming body, said elastic layer having applied to it surface a resin component having an elongation at rupture of less than 10% as measured according to JIS K7113; and wherein the surface of said elastic layer has a JIS B0601 ten point mean roughness Rz and the resin component applied to the surface of the elastic layer has a thickness t which satisfy the relationship: 0.01<t/Rz<1.

2. The developing roller of claim 1 wherein the resin component is at least one member selected from the group consisting of a urea resin, melamine resin, alkyd resin, modified alkyd resin, oil-free alkyd resin, acryl resin, silicone resin, phenol resin, and moisture-curable urethane resin.

3. The developing roller of claim 1 wherein said image forming body is a latent image holder having an electrostatic latent image borne on its surface, and the one-component developer is supplied from the developing roller to the surface of the latent image holder for visualizing the latent image.

4. The developing roller of claim 1, wherein said elastic layer has a resistance of $10^3$ to $10^{10}$Ω cm.

5. The developing roller of claim 1, wherein said elastic layer has a hardness of less than 60° measured on JIS A.

6. The developing roller of claim 1, wherein said resin component has an elongation at rupture of less than 5% as measured according to JIS K7113.

7. The developing roller of claim 1, wherein said resin component includes an additive for reducing friction at an amount of about 1 to 100 parts by weight per 100 parts by weight of the resin component.

8. The developing roller of claim 1, wherein said resin component includes an ionic conductive additive for reducing friction at an amount of 0.001 to 1 part by weight per 100 parts by weight of the resin component.

9. A developing apparatus comprising; an image forming body and a rotatable developing roller for carrying a one-component developer on its outer surface wherein; said developing roller is brought in contact with or in proximity to the surface of said image forming body while rotating such that the developer is adhered to the surface of said image forming body to form a visible image on the surface of said image forming body, said developing roller comprising a highly conductive shaft and a conductive elastic layer formed around the shaft, said elastic layer having applied to its surface a resin component having an elongation at rupture of less than 10% as measured according to JIS K7113: and wherein the surface of said elastic layer has a JIS B0601 ten point mean roughness Rz and the resin component applied to the surface of the elastic layer has a thickness t which satisfy the relationship: $0.01 < t/Rz < 1$.

10. The developing apparatus of claim 9 wherein said image forming body is a latent image holder having an electrostatic latent image borne on its surface, and the one-component developer is supplied from the developing roller to the surface of the latent image holder for visualizing the latent image.

11. The developing apparatus of claim 9, wherein said elastic layer has a resistance of $10^3$ to $10^{10} \Omega$ cm.

12. The developing apparatus of claim 9, wherein said elastic layer has a hardness of less than 60° measured on JIS A.

13. The developing apparatus of claim 9, wherein said resin component has an elongation at rupture of less than 5% as measured according to JIS K7113.

14. The developing apparatus of claim 9, wherein said resin component includes an additive for reducing friction at an amount of about 1 to 100 parts by weight per 100 parts by weight of the resin component.

15. The developing apparatus of claim 10, wherein said resin component includes an ionic conductive additive for reducing friction at an amount of 0.001 to 1 part by weight per 100 parts by weight of the resin component.

* * * * *